Dec. 2, 1941.   H. SINCLAIR   2,264,340
HYDRAULIC COUPLING
Filed April 1, 1939
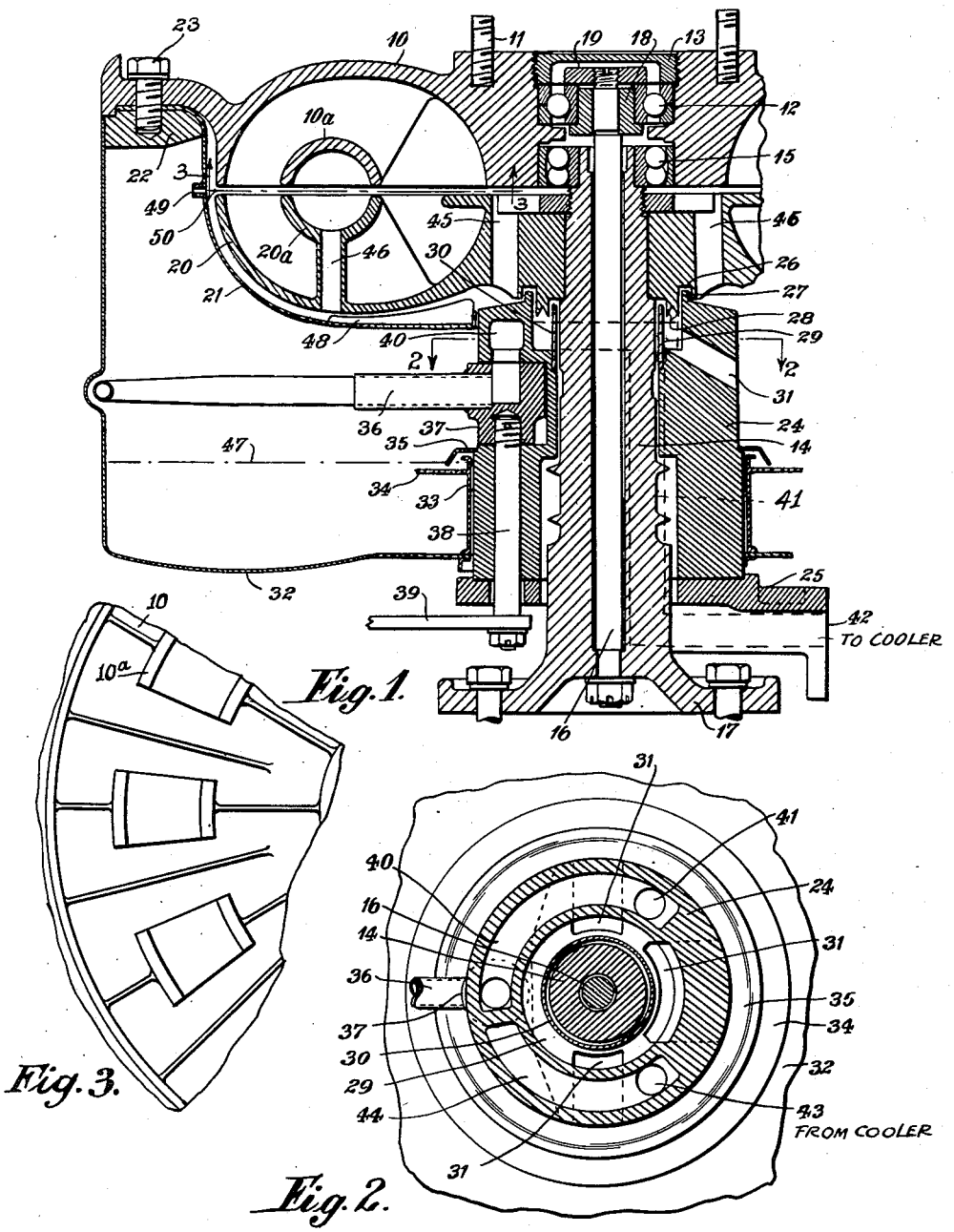
INVENTOR
*Harold Sinclair*
BY
*Dean Fairbank & Hirsch*
ATTORNEYS Patented Dec. 2, 1941

2,264,340

UNITED STATES PATENT OFFICE 2,264,340

HYDRAULIC COUPLING

Harold Sinclair, Kensington, London, England

Application April 1, 1939, Serial No. 265,417
In Great Britain April 7, 1938

13 Claims. (Cl. 60—54)

This invention relates to hydraulic couplings of the kinetic type and of the kind having a vaned impeller element juxtaposed to a vaned runner element to form therewith an annular working circuit in which working liquid can circulate in the form of a vortex ring, a casing enclosing one or both of said elements to form a working chamber, and means whereby the liquid content of this working chamber can be varied while the coupling is operating. The said casing is usually fixed to one of said vaned elements and encloses the back of the other of said vaned elements to form the working chamber.

The centre of the said casing is usually provided with an aperture accommodating a member relative to which the casing is rotatable (such as a shaft to which is fixed the vaned element that is rotatable relative to the casing, or a fixed manifold containing emptying or filling ducts, or a tubular manifold surrounding the last-mentioned shaft). A coupling of this type, and in which the casing, as is usual, is fixed to the impeller member and encloses the back of the runner member, is shown, for example, in Fig. 1 of United States Patent No. 2,187,667, granted Jan. 16, 1940.

Such couplings are commonly employed to connect a continuously-running motor, which may run at varying speeds, to a driven-machine which is started and stopped by filling and emptying the coupling and which is caused to run at a widely varying speed by varying the degree of filling of the coupling. It has been found that, when the slip in the coupling is high, for example on starting from rest a load requiring a considerable torque, liquid in the working circuit is driven by the vortex action under relatively high pressure into the space between the back of the runner and the casing attached to the impeller. In the coupling hereinbefore referred to as an example, this pressure causes undesirable leakage through the aperture in the casing. Even when a labyrinth gland is provided with the object of reducing leakage through this aperture, under certain circumstances the back pressure may be so high and the consequent leakage so considerable as to delay substantially the filling of the working circuit.

Furthermore, where, as is common, the duct for filling the working chamber debouches into the space between the back of the runner and the casing, the back pressure opposes the inflow of liquid into the working chamber, and where the pressure available in the filling duct is limited, as may be the case with a coupling having a kinetic pump for filling or a scoop tube in a rotatable casing (for example as shown in Figs. 1, 3 and 4 of my United States Patent No. 1,859,607 and Fig. 1 of United States Patent No. 2,187,667 hereinabove referred to) the back pressure under certain conditions may prevent the flow of liquid into the working chamber.

The difficulty of gland leakage from the space between the casing and the back of the vaned element relatively to which the casing is rotatable can be avoided by coupling one of the shafts to the casing and arranging for the other of the shafts to penetrate a central aperture in the vaned member that is fixed to the casing. But even with this arrangement it may be desirable to use a filling duct in the form of an axial bore in one of the shafts, which debouches into the space between the casing and the vaned element enclosed thereby, with the result that the difficulty of back pressure on the filling duct remains.

An object of this invention is to provide an improved hydraulic coupling having means for overcoming the difficulties referred to.

According to this invention, in a hydraulic coupling of the kind set forth, in which there is a communication between the working circuit and the exterior of the working chamber through the space between the casing and the back of one of the vaned elements which is enclosed by the casing (the communication being for example a clearance space, or the leakage path in a gland, or the filling duct), there are provided centrifugal pumping means arranged to rotate with the driving part of the coupling and so disposed in said space as to oppose the outflow of liquid from the working chamber through said communication.

The said centrifugal pumping means conveniently have the form of vanes which are radial or have a radial component with respect to the axis of rotation of the coupling and which are fixed to the interior of the said casing, or to the back of the vaned element shrouded by this casing, whichever is constrained to rotate with the driving part.

This invention will be further described by way of example, with reference to the accompanying drawing, as applied to a scoop-controlled coupling of the general type disclosed in the said United States Patent No. 2,187,667, granted Jan. 16, 1940, but adapted to operate with its axis vertical. With such a coupling there is a tendency, when the working circuit is being rapidly filled, or when the coupling runner is stalled under load, for the working liquid to leak downwards between the depending driven shaft and the scoop-tube housing sleeve; and the present invention is particularly useful in reducing or preventing such leakage as well as in contributing to rapid filling of the working circuit.

In the drawing:

Fig. 1 is a sectional side elevation of part of the coupling,

Fig. 2 is a sectional plan of a detail, taken on the line 2—2 in Fig. 1, and

Fig. 3 is a sectional end elevation, taken on the line 3—3 in Fig. 1.

The coupling shown in the drawing is suitable for use, for example, in driving a centrifugal separator such as is employed in sugar refineries. A vaned impeller element 10 is secured by studs 11 to the vertically disposed shaft of an electric motor (not shown). A thrust bearing 12 is fitted in a counterbore in the hub of the impeller and retained by a screw-threaded plug 13. A hollow driven shaft 14 has its upper end journalled by a self-aligning bearing 15 in the hub of the impeller, so that the axis of the shaft 14 is capable of limited angular deviation with respect to the axis of the impeller 10, and the driven shaft is located axially by a slightly flexible rod 16 the lower end of which is fixed in the coupling flange 17 formed on the lower end of the shaft 14. The upper end of the rod 16 is fixed by a collar 18 and a nut 19 to the inner race of the bearing 12. A vaned runner element 20 is fixed to the shaft 14 and forms with the impeller element an annular working circuit. The core guide rings 10a and 20a may be interrupted as shown in Fig. 3 and as described in United States Patent No. 2,139,107. A casing 21 is fixed by a ring 22 and screws 23 to the impeller, forming therewith a working chamber.

The casing 21 is provided with a central aperture accommodating the upper end of a tubular manifold sleeve 24 the lower end of which is carried by a bracket 25 fixed to a rigid support (not shown). The lower face of the hub of the runner 20 is provided with an annular groove 26 accommodating a baffle ring 27 on the end of the sleeve 24. Annular projections 28 on the hub of the runner are adapted to throw off any liquid that leaks over the baffle ring 27 and discharge it into an annular well 29 in the upper end of the sleeve 24, the inner wall of this well being formed by a short tube 30 fixed to the sleeve. This well communicates with the exterior of the sleeve by drains 31.

A reservoir shell 32 is welded to the ring 22 and is provided with an upstanding internal sleeve 33 around the central aperture therein accommodating the manifold sleeve 24. The sleeve 33 is provided with a liquid thrower ring 34, and a dished shield ring 35 is fixed to the manifold sleeve and covers the upper end of the sleeve 33.

A scoop tube 36 is fixed in a boss 37 which is accommodated in a tangential groove in the manifold sleeve and in turn is fixed to a control shaft 38 journalled in the manifold sleeve and actuated by control means including a lever 39 for the purpose of varying the spacing of the mouth of the scoop tube from the periphery of the shell 32. The scoop tube delivers liquid to an arcuate duct 40 which communicates by an axial duct 41 with a flanged coupling 42 leading to a cooler (not shown) which is disposed below the coupling. The return pipe from the cooler communicates by a similar flanged coupling (disposed above the section plane of Fig. 1) and a duct 43 with an arcuate channel 44 (Fig. 2) which registers with filling ducts 45 formed axially through the hub of the runner. Bores 46 formed in some of the runner vanes connect the core of the working circuit to the space between the casing 21 and the runner 20.

The radially inner part of the casing 21 is spaced somewhat from the back of the runner 20, and twelve uniformly distributed radial vanes 48 are fixed to the upper face of this inner part of the casing, being shaped to extend to within a safe working clearance of the runner. The inner ends of these vanes are as near to the axis of rotation as can conveniently be arranged, and in this example they extend to a radius equal to the radius about the coupling axis on which the centre of the section of the core of the working circuit lies.

This coupling operates as follows: The motor being at rest, liquid is inserted into the reservoir and cooler circuit until it rises to the level denoted by 47. The scoop tube is displaced from the position shown to its radially inner position and the motor is started. The liquid in the reservoir now forms a ring lying against the cylindrical part of the reservoir shell, the runner remaining at rest. When the motor has attained full speed, the scoop tube is moved outwards until its mouth engages the ring of liquid, so that liquid is delivered through the cooler to the arcuate channel 44 in the upper end of the manifold sleeve 24 and thence to the working chamber. As soon as a substantial quantity of liquid has entered the working circuit, the vortex action drives liquid under relatively high pressure out of the working circuit, through the gap 50 between the vaned elements 10 and 20 at the flow junction and through the bores 46, into the space between the runner 20 and the casing 21. If the vanes 48 were not provided, this pressure would be sufficient to retard substantially the delivery of liquid by the scoop tube, to cause excessive leakage through the drains 31 back to the reservoir, and even, under unfavourable circumstances, to cause leakage through the space between the driven shaft 14 and the manifold 24. The vanes 48, however, since they rotate with the impeller, exert a powerful centrifugal pumping action opposing the leakage and assisting the flow of liquid into the working chamber, which can therefore be filled rapidly as is desired. When the core rings 10a and 20a are interrupted, in the manner previously referred to, a high starting torque is developed even more rapidly by the action of the vanes 48 than if continuous core rings were used. The quantity of liquid in the working chamber is determined by the position of the scoop, and while the coupling is operating a limited quantity of heated liquid leaks from the working chamber through one or more restricted nozzles 49 so as to maintain a circulation through the scoop tube and the cooler.

In some cases it is desirable to lengthen the vanes 48 so that they extend nearly to the maximum diameter of the working chamber. For couplings of sizes up to 20 inches outer profile diameter twelve vanes 48 give very satisfactory results; six vanes do not give such good results and the use of twenty-four vanes is not justified. Although the example shown is a vertical coupling, the invention is clearly also useful for horizontal couplings.

I claim:

1. A hydraulic coupling comprising a vaned impeller element juxtaposed to a vaned runner element to form therewith an annular working circuit, a rotatable casing enclosing a working chamber including said elements, means including a reservoir chamber whereby the liquid content of said working chamber can be varied while the coupling is operating, there being a filling duct between said reservoir chamber and said working circuit, said duct debouching into the space between said casing and the back of one of said vaned elements enclosed thereby, kinetic pumping means associated with said filling duct, and centrifugal pumping means arranged to rotate with said impeller element and so disposed in said space as to reduce fluid pressure opposing the flow of liquid through said filling duct into said space.

2. A hydraulic coupling comprising a vaned impeller element juxtaposed to a vaned runner element to form therewith an annular working circuit, the axes of said elements being capable of limited relative deviation, a casing fixed to one of said vaned elements and enclosing the back of the other of said vaned elements, the casing and the one of said vaned elements to which it is fixed together forming a working chamber, a shaft carrying the other of said vaned elements and passing with radial clearance through a central aperture in said casing, means including a reservoir chamber and a kinetic pump therein whereby the liquid content of said working chamber can be varied while the coupling is operating, there being a communication between said working circuit and said reservoir chamber through the space between said casing and the back of the one of said vaned elements enclosed thereby and through said clearance, and centrifugal pumping means disposed in said space and capable of being rotated by said impeller so as to reduce fluid pressure causing leakage at said clearance.

3. A hydraulic coupling comprising a vaned impeller element juxtaposed to a vaned runner element to form therewith an annular working circuit, a casing fixed to said impeller element and enclosing the back of said runner element, said casing and impeller element together forming a working chamber, a shaft carrying said runner element and passing with radial clearance through a central aperture in said casing, means including a reservoir chamber and a kinetic pump therein whereby the liquid content of said working chamber can be varied while the coupling is operating, there being a communication between said working circuit and said reservoir chamber through the space between said casing and the back of said runner element and through said clearance, and centrifugal pumping means mounted on the interior of said casing for reducing fluid pressure causing leakage at said clearance.

4. A hydraulic coupling comprising a vaned impeller element juxtaposed to a vaned runner element to form therewith an annular working circuit, a casing enclosing the back of one of said vaned elements and fixed to the other of said vaned elements to form therewith a working chamber, said casing having a central aperture, a manifold penetrating said aperture and including a filling duct debouching within the space between said casing and the back of the one of said vaned elements enclosed thereby, kinetic pumping means for feeding said filling duct, and centrifugal pumping means which are disposed within said space and which are capable of being rotated by said impeller element for the purpose of reducing back pressure on said filling duct.

5. A hydraulic coupling comprising a vaned impeller element juxtaposed to a vaned runner element to form therewith an annular working circuit, a casing enclosing the back of said runner element and fixed to said impeller element to form therewith a working chamber, said casing having a central aperture, a manifold penetrating said aperture with a working clearance space and including a filling duct debouching within the space between said casing and the back of said runner element, kinetic pumping means associated with said filling duct, and centrifugal pumping means which are mounted on the interior of said casing for the purpose of reducing back pressure on said filling duct and at said working clearance space.

6. A hydraulic coupling comprising a vaned impeller element juxtaposed to a vaned runner element to form therewith an annular working circuit, a casing enclosing a working chamber including said elements, a stationary member including a filling duct debouching into the space between said casing and the one of said vaned elements enclosed thereby, kinetic pumping means for delivering working liquid to said filling duct, and centrifugal pumping means capable of being rotated by said impeller element and so disposed in said space as to reduce back pressure on said filling duct.

7. A hydraulic coupling comprising a vaned impeller element juxtaposed to a vaned runner element to form therewith an annular working circuit, a casing enclosing the back of one of said vaned elements and fixed to the other of said vaned elements to form therewith a working chamber, said casing having a central aperture, a manifold penetrating said aperture and including a filling duct debouching within the space between said casing and the back of the one of said vaned elements enclosed thereby, a rotary reservoir chamber co-axial with said working chamber, means for exhausting liquid from said working chamber to said reservoir chamber, scooping means disposed in said reservoir chamber for transferring working liquid from said reservoir chamber to said filling duct, and centrifugal pumping means which are disposed within said space and which are capable of being rotated by said impeller element for the purpose of reducing back pressure on said filling duct.

8. A hydraulic coupling comprising a vaned impeller element juxtaposed to a vaned runner element to form therewith an annular working circuit, a casing enclosing the back of said runner element and fixed to said impeller element to form therewith a working chamber, said casing having a central aperture, a manifold penetrating said aperture and including a filling duct debouching within the space between said casing and the back of said runner, a reservoir shell constrained to rotate with said impeller element and forming with said casing a reservoir chamber, means for exhausting liquid from said working chamber to said reservoir chamber, scooping means on said manifold for engaging liquid in said reservoir chamber and transferring it to said filling duct, and centrifugal pumping means disposed in said space and capable of being rotated by said impeller for the purpose of relieving back pressure on said filling duct.

9. A hydraulic coupling comprising a vaned impeller element juxtaposed to a vaned runner element to form therewith an annular working circuit, a casing fixed to said impeller element and enclosing the back of said runner element, said casing and impeller element together forming a working chamber, means including a reservoir chamber whereby the liquid content of said working chamber can be varied while the coupling is operating, said means including a filling duct debouching into the space between said casing and the back of said runner element, kinetic pumping means associated with said filling duct, there being a communication between said working circuit and said reservoir chamber through said space, and vanes disposed on the interior of said casing in directions having at least a radial component.

10. A hydraulic coupling comprising a vaned impeller element juxtaposed to a vaned runner element to form therewith an annular working circuit, at least one of said vaned elements having an annular core guide ring so interrupted as to permit the passage of working liquid therethrough in a direction axially of the coupling, a rotatable casing enclosing a working chamber including said elements, means including a reservoir chamber whereby the liquid content of said working chamber can be varied while the coupling is operating, there being a communication between said working circuit and said reservoir chamber through the space between said casing and the back of one of said vaned elements enclosed thereby, and centrifugal pumping means arranged to rotate with said impeller element and so disposed in said space as to oppose the outflow of liquid from said working chamber through said space.

11. A hydraulic coupling capable of operating with its axis of rotation vertical and comprising a vaned impeller element, a vaned runner element disposed beneath said impeller element, a casing shrouding the under side of said runner element and fixed to said impeller element to form therewith a working chamber, said casing having a central aperture, a rotary shell defining with said casing a reservoir chamber disposed at least in part beneath said working chamber, said shell having a central aperture, a manifold penetrating both of said apertures, an annular wall surrounding said manifold and standing up from said shell around the aperture therein, deflecting means on said manifold shielding the upper end of said wall, and scooping means on said manifold for engaging liquid in said reservoir chamber and delivering it to said working chamber, the volume of the space in said reservoir chamber below the upper edge and outside of said wall being not less than the normal maximum liquid content of said working chamber.

12. A hydraulic coupling capable of operating with its axis of rotation vertical and comprising a vaned impeller element, a vaned runner element disposed beneath said impeller element, a driven shaft fixed to and projecting downwards from said runner element, a casing shrouding the under side of said runner element and fixed to said impeller element to form therewith a working chamber, said casing having a central aperture, a rotary shell defining with said casing a reservoir chamber disposed at least in part beneath said working chamber, said shell having a central aperture, a manifold sleeve surrounding said driven shaft and penetrating both of said apertures, means providing a labyrinth seal between said runner element and said manifold sleeve, said means including an annular well in the upper end of said sleeve and a drain leading from said well to said reservoir chamber, and scooping means on said manifold for engaging liquid in said reservoir chamber and delivering it to said working chamber.

13. A hydraulic coupling capable of operating with its axis of rotation vertical and comprising a vaned impeller element, a vaned runner element disposed beneath said impeller element, a casing shrouding the under side of said runner element and fixed to said impeller element to form therewith a working chamber, said casing having a central aperture, a rotary shell defining with said casing a reservoir chamber disposed at least in part beneath said working chamber, said shell having a central aperture, a manifold penetrating both of said apertures, scooping means on said manifold for engaging liquid in said reservoir chamber and delivering it into the space between said casing and said runner element, and centrifugal pumping means disposed in said space and constrained to rotate with said impeller element.

HAROLD SINCLAIR.